United States Patent
Baginski et al.

(10) Patent No.: US 8,055,405 B2
(45) Date of Patent: Nov. 8, 2011

(54) INDUSTRIAL TRUCK WITH ACQUIREMENT OF UTILIZATION DATA

(75) Inventors: Ralf Baginski, Neetze (DE); Frank Manken, Henstedt-Ulzburg (DE); Martin Von Werder, Ammersbek (DE)

(73) Assignee: Jungheinrich Atiengesellschaft, Hamburg (DE)

( * ) Notice: Subject to any disclaimer, the term of this patent is extended or adjusted under 35 U.S.C. 154(b) by 921 days.

(21) Appl. No.: 11/680,310

(22) Filed: Feb. 28, 2007

(65) Prior Publication Data
US 2007/0208476 A1    Sep. 6, 2007

(30) Foreign Application Priority Data
Mar. 3, 2006  (DE) ................. 10 2006 010 291

(51) Int. Cl.
*G01M 17/00* (2006.01)
*G06F 19/00* (2011.01)
*G06F 17/00* (2006.01)
*G06F 7/70* (2006.01)
*B66B 1/34* (2006.01)
*B66B 3/00* (2006.01)

(52) U.S. Cl. .............. 701/35; 701/36; 701/50; 705/400; 705/414; 187/391

(58) Field of Classification Search .............. 701/1, 29, 701/32, 35, 36, 50, 30, 200, 206–208; 705/1, 705/400, 414, 417; 187/390, 391, 393, 394
See application file for complete search history.

(56) References Cited

U.S. PATENT DOCUMENTS

| 4,839,835 | A  | * | 6/1989 | Hagenbuch ............... 702/174 |
| 6,825,766 | B2 | * | 11/2004 | Hewitt et al. ............. 340/572.7 |
| 6,952,680 | B1 | * | 10/2005 | Melby et al. ................ 705/28 |
| 7,301,439 | B2 | * | 11/2007 | Hashimoto et al. ........ 340/10.51 |
| 7,579,951 | B2 | * | 8/2009 | Hirahara et al. ........... 340/572.1 |
| 2002/0070862 | A1 |   | 6/2002 | Francis |
| 2005/0125247 | A1 | * | 6/2005 | Ding et al. ................. 705/1 |
| 2005/0273218 | A1 | * | 12/2005 | Breed et al. ............... 701/2 |
| 2007/0198282 | A1 | * | 8/2007 | Williams et al. ............ 705/1 |
| 2008/0114502 | A1 | * | 5/2008 | Breed et al. ............... 701/2 |

FOREIGN PATENT DOCUMENTS

DE    198 57 022 A1    6/1999
DE    100 15 009 A1    10/2001
DE    20 2005 015 095 U1    1/2006

OTHER PUBLICATIONS

"Still Fleetmanager of the German Still GmbH in Hamburg", Herbezeuge Und Fordermittel, Berlin 49 (2000)11, pp. 576-577.
MM Logistik, 7, 2005, p. 65.
Betriebstechnik akuell 39(1998) 10, pp. 34-35.
Hebezeuge und Fordermittel, Berlin 45( 2005) 3. pp. 116-118.
LOGISTIK fur Unternehmen Nov./Dec. 2005, p. 15.

* cited by examiner

*Primary Examiner* — Tuan C. To
*Assistant Examiner* — Edward Pipala
(74) *Attorney, Agent, or Firm* — Vidas, Arrett & Steinkraus

(57) ABSTRACT

An industrial truck with an electronic memory and/or a data transfer unit, an equipment for acquiring utilization data and a control unit, which is connected with the equipment for acquiring utilization data and the memory and/or the data transfer unit, characterized in that the control unit continuously generates an utilization protocol from the acquired utilization data and files it in the memory or transmits it to the data transfer unit.

19 Claims, 2 Drawing Sheets

INDUSTRIAL TRUCK WITH ACQUIREMENT OF UTILIZATION DATA

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to an industrial truck with an equipment for acquiring utilization data, more particular to an industrial truck in which the acquired utilization data are continuously filed in an utilization protocol.

When using industrial trucks, it is usual that customers not only buy the vehicles they need for their internal transportation duties from the manufacturer, but lease them only for a predetermined duration of utilization instead. Frequently, a so-called full service agreement is signed in addition, through which the manufacturer obligates himself to take over all the maintenance and repair works arising in the operation of the vehicles for a fixed monthly cost rate.

For the customer as well as for the manufacturer of the industrial trucks, the success of this business model depends on in which way and under which conditions the vehicles are utilized. With conventional industrial trucks, only rough estimations about the real utilization can be made, which can be only scrutinized with difficulty on the manufacturers side, moreover.

A maintenance according to needs is also a problem in leased industrial trucks. Maintenance operations performed too early as well as those performed too late cause high costs. The maintenance intervals have to be determined on the basis of rough estimates and experimental values.

Departing from this, it is the objective of the present invention to provide an industrial truck which facilitates a maintenance according to needs, in leasing applications in particular.

BRIEF SUMMARY OF THE INVENTION

The industrial truck according to the present invention has an electronic memory and/or a data transfer unit, an equipment for acquiring utilization data and a control unit, which is connected with the equipment for acquiring utilization data and the memory and/or the data transfer unit, wherein the control unit continuously generates an utilization protocol from the acquired utilization data and stores it in the memory or transmits it to the data transfer unit.

In this, the acquired utilization data can comprise in principle all the operation data of the industrial truck, in particular those which permit an inference about the real utilization and the working stress of the industrial truck. A control unit, connected with the equipment for acquiring utilization data, continuously creates entries in an utilization protocol and files them for later analysis in the memory or transmits it to a data transfer unit.

According to one embodiment, it is provided that the equipment for acquiring utilization data comprises a speed sensor for measuring the speed of the industrial truck. It is known that many components of an industrial truck are more stressed at higher travelling speed. Entering the speed data into the utilization protocol makes possible a corresponding detailed analysis.

Further, it is provided that the equipment for acquiring utilization data comprises an acceleration sensor for measuring the acceleration of the industrial truck. Strong acceleration, i.e. fast drive-away, sudden braking or fast curve driving, lead also to increased operational demands of the industrial trucks, which are suitably also recorded in the utilization protocol. Preferably, the acceleration sensor is also used for acquiring concussions of the industrial truck. In particular, such concussions occur as a consequence of floor unevennesses, potholes in particular. The concussions caused by travelling over these floor unevennesses also contribute to an increased operational demand of the industrial truck. The same is valid for concussions which are caused by collisions with other vehicles of objects.

According to one embodiment, the utilization data include the distance travelled by the industrial truck. In the simplest case, the travelled distance can be determined by counting the rotations of a wheel of the industrial truck. Alternatively, it is also possible to analyse the signals of a speed- or acceleration sensor.

In a preferred embodiment of the present invention, the equipment for acquiring utilization data comprises a load sensor for determining the weight of a load. Such a load sensor can be integrated into the load holding means or it can determine the weight of a load from an oil pressure inside the hydraulic system. More preferably, not only the weight of a load is acquired, but the equipment for acquiring utilization data has additionally or independently from it a device for measuring the lifting height of a load. As the case may be, the work performed by the lifting system of the industrial truck can be established from the weight and the lifting height of a load.

According to one embodiment, the equipment for acquiring utilization data comprises a device for measuring at least one parameter of the hydraulic system of the industrial truck. In particular, into consideration comes here the oil pressure, the amount of pumped oil as well as the power consumption of a drive motor of the hydraulic system. All the designated parameters are in connection with the operational demands of the industrial truck. By taking the measurement values at the hydraulic system itself, even all the other hydraulically operated systems, a hydraulic steering for instance, are embraced in the utilization acquirement in addition to the lifting function.

In a further embodiment, it is provided that the equipment for acquiring utilization data comprises a sensor in the driver's seat for recognising the presence of a driver. The corresponding utilization data give information about the real operation duration of the industrial truck.

Preferably, the equipment for acquiring utilization data is connected to the vehicle control for acquiring control data. Thus, relevant data from the vehicle control can be included in the utilization protocol. The relevant data are for instance steering angle, lifting- or lowering commands, positions of the gas pedal, rotation speeds of motors, braking intervention or a reversal of the travelling direction.

According to one embodiment, the equipment for acquiring utilization data comprises a sending and receiving unit for reading out RFID-transponders. RFID means Radio Frequency Identification and is used for acquiring the code or the memorised data of a corresponding RFID tag. According to the present invention, it is provided to arrange such RFID tags on the loads to be transported, certain storeroom positions and/or at certain path points in a storage hall. Through this, it becomes possible to acquire accurately and with great security utilization relevant data, like the distance travelled between different path points for instance, properties of the transported wares, like the weight or a certain packaging type for instance, or even the storeroom positions met by the industrial truck. By doing so, a very individual utilization protocol can be established. Further, it is provided to equip the driver with a corresponding RFID tag too, which can be read out by the sending and receiving unit. By doing so, there is the possibility to memorise also information about the driver really commanding the industrial truck in the utilization protocol.

In principle, the RFID transponders can work in any arbitrary frequency band, however, the UHF band is preferred, UHF means Ultra High Frequency and it ensures that the RFIF transponders can still be read without errors even at a greater distance from the sending and receiving unit.

According to one embodiment, the utilization protocol contains a consolidated version of the utilization data. In principle, it is possible to journalise all the utilization data. In order to do this, a fixed clock pulse may be quoted, in which the control unit reads out the acquired utilization data and enters them into the utilization protocol. More advantageous, however, is a consolidated, i.e. selective or summarising storage of the utilization data. For instance, the control unit can enter the travelled distance in another clock pulse than that of other utilization data into the utilization protocol. Thus, an utilization protocol optimised for the further processing can be established. In particular, it is possible to match the length of the utilization protocol with the available memory capacity. It is also possible that the utilization protocol contains only a few parameters, which summarise the acquired utilization data of an entire day or a shift, for instance. In doing so, the control unit can summarise the utilization data such that these few parameters give reliable information about the real operational demands in the respective period of time.

In a preferred embodiment, a hard disc, a memory chip or a chip card is used as the electronic memory. In principle, any storage medium which can memorise the required data amount can be taken into consideration. The use of a chip card has the advantage that the acquisition of an utilization protocol can be combined with further functions of the chip card, like an usage authorisation for the driver, which proves his/her authorisation with the aid of the chip card. Besides, the utilization data can be handed over to an analysing system in a particularly simple manner with the aid of a chip card.

A further embodiment of the present invention provides to integrate the electronic memory into a wireless network. Thus, the utilization protocols can be written into the memory or read out from it in a wireless manner. In particular, this form of realisation is suitable in connection with a chip card which is realised as a RFID card itself. By the wireless data transfer, it is achieved that the chip card has not to be put in at the industrial truck, but can be worn on the body by the driver, for instance. Through this, the chip card can be used in a particularly advantageous way as a memory for the utilization protocols and for further functions simultaneously, like the access authorization to the vehicle or to a storage hall for instance. For the communication with the chip card, a separate sending and receiving unit may be provided at the industrial truck's side. Also, the sending and receiving unit, which is provided for reading out the RFID tags arranged on the products or at certain points inside the storeroom, can be advantageously used.

Preferably, the invention has a data analysing unit, which reads out the utilization protocol from the electronic memory and/or receives it from the data transfer unit. As a data analysing unit, an external PC comes into consideration in particular, which is used for the administration of the vehicle fleet by the operating company of the storeroom. Depending on the realisation of the electronic memory, it is provided in particular to read out the data from a chip card. Alternatively or in addition, the data analysing unit can be also connected to a wireless network, which receives the utilization protocols transmitted by the data transfer unit of the industrial truck. The utilization protocols can be forwarded to the manufacturer or provider of the industrial trucks by the data analysing unit.

According to a preferred embodiment, the data analysing unit announces the dueness of maintenance operations. For this purpose, analyses of the operational demands of the industrial truck, as the case may be also of individual components of the industrial truck, are established based on the journalled utilization data These analyses permit a prediction according to need of the extent and dueness of maintenance operations. The fixing of the maintenance intervals according to need can reduce the cost of the maintenance operations and in particular, it can avoid additional expenses which a belated maintenance may invite.

In a further embodiment, the data analysing unit predetermines an utilization fee. Thus, a payment system for the utilization of the industrial truck can be provided, which individually determines the real operational demands and utilization intensity on the basis of the acquired utilization data. The predetermined utilization fee can already have the form of a sum to be paid, however, it is also provided to establish an index for the operational demands or the utilization intensity which is later converted into a fee. Thus, the remuneration for the provision of the industrial truck will do justice to the interests of the company operating the storeroom which calls on the service, as well as to those of the provider or manufacturer, respectively, of the industrial truck.

BRIEF DESCRIPTION OF THE DRAWINGS

In the following, the present invention is explained in more detail by means of a realisation example and a delineation.

DETAILED DESCRIPTION OF THE INVENTION

Figure 1:
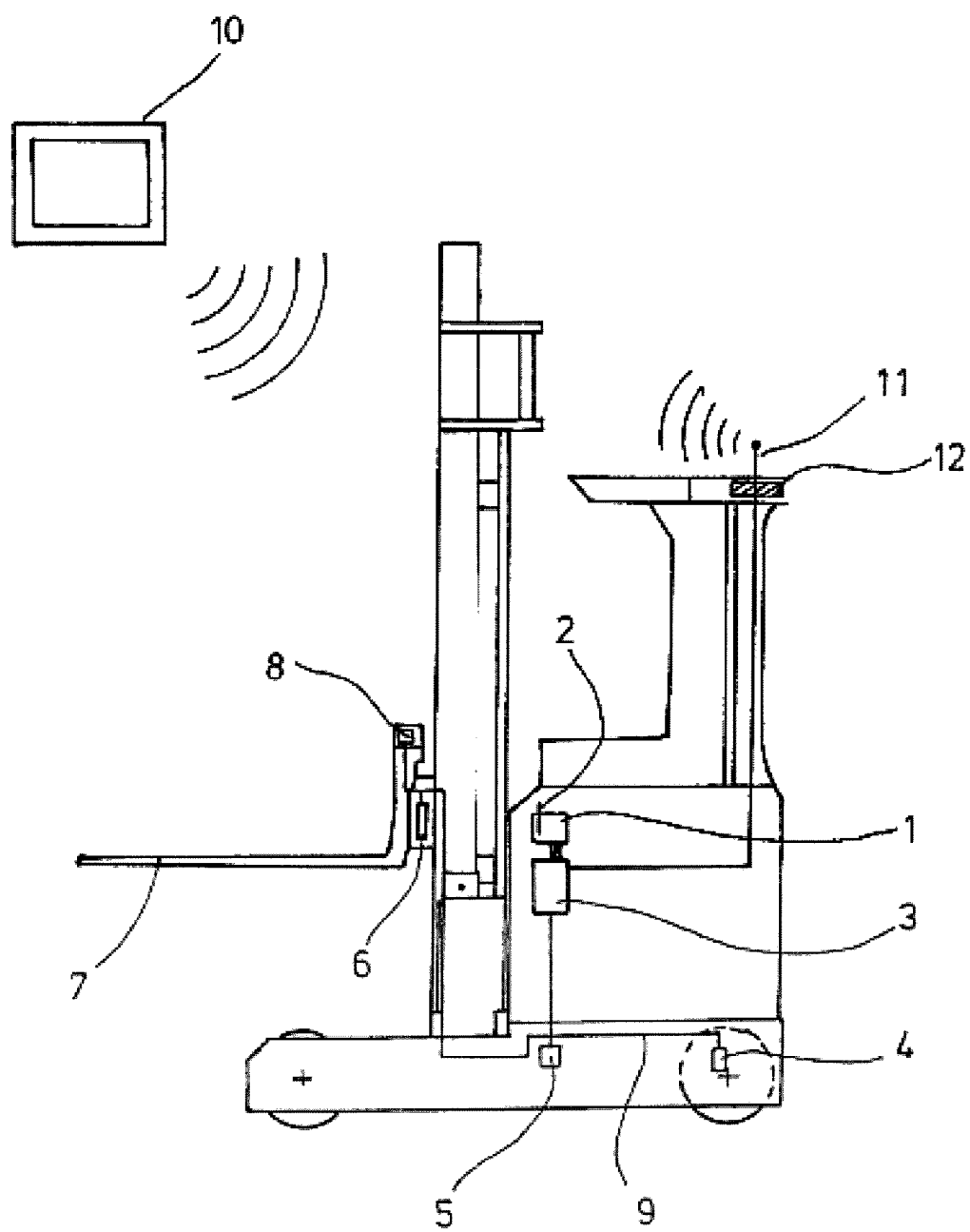
FIG. 1 shows an industrial truck according to the present invention.

While this invention may be embodied in many different forms, there are described in detail herein a specific preferred embodiment of the invention. This description is an exemplification of the principles of the invention and is not intended to limit the invention to the particular embodiment illustrated The industrial truck has an electronic memory 1, into which a chip card 2 is put in. On the chip card 2, the utilization protocols are memorised. A control unit 3 is connected with the electronic memory 1. Alternatively, the chip card may be also realised as a RFID card and it may be in communication with the control unit 3 via a suitable sending and receiving unit in a wireless manner.

The control unit 3 processes the utilization data provided by an equipment for acquisition and establishes a selection of relevant entries for the utilization protocol from the multiplicity of utilization data, for memorising them on the chip card 2 and/or for transferring them to a data analysing unit 10, via a wireless protocol for instance (WLAN, GSM etc.). For the transfer to a data analysing unit 10, an antenna 11 is provided on the industrial truck. The antenna 11 is a part of a data transfer unit 12, which is connected with the control unit 3.

In the present example of realisation, the equipment for acquiring utilization data includes a speed sensor 4, which is disposed in the vicinity of the axis of a wheel of the industrial truck and continuously acquires information about the travelling speed of the industrial truck and forwards it to the control unit 3, For this purpose, it is connected with the control unit 3 via a line 9.

Also connected with the control unit 3 is an acceleration sensor 5, which is fixedly attached on the industrial truck. The acceleration sensor 5 acquires the acceleration of the industrial truck in the travel direction when accelerating and braking down as well as a transverse acceleration when driving curves, in addition also concussions in collisions with other vehicles or objects or as a consequence of floor unevennesses. The acceleration data are also transmitted to the control unit 3 via a line.

In the region of the load holding means 7, a load sensor 6 is disposed. The load sensor 6 continuously detects the weight of a load lifted up by the load holding means 7 and makes these utilization data also available to the control unit 3.

In the proximity of the loads to be lifted, a sending and receiving unit 8 for reading out RFID transponders is further arranged. The sending and receiving unit 8 reads product codes of RFID tags, which are disposed on the conveyed loads. In addition to the product codes, these RFID tags may also provide other information, the weight of the load or other product properties, for instance. Further data can be read out by additional RFID tags, which are disposed on certain path points in the storage hall. The read out data are transmitted to the control unit 3 by the sending and receiving unit and lead to corresponding entries into the utilization protocol on the chip card 2. In the subsequent analysis of the utilization protocol, statements concerning the real operational demands and utilization intensity of the industrial truck are calculated from the acquired utilization data, including the received data of the RFID tags. Thus, accurate information about the real utilization of the industrial truck is obtained, which is used for maintenance according to need and a stipulation of a remuneration taking into account the real operational demands.

For a remuneration depending on the utilization of the services of an industrial truck in particular, it is provided that the industrial truck is capable by means of an integrated write/read unit to acquire accurate data concerning kind and properties of the transportation good during the transportation process already, in which the transportation good is situated on a load fork. For this purpose it is required that the data are deposited in a RFID transponder, which is situated directly on the transportation good or in the load carrier, respectively. Depending on the memorised information, the weight and volume of the transportation good can be transmitted to the industrial truck, for instance. But other higher-ranking data, like owner, consignee, proprietor and manufacturer of the ware for instance, can be received and memorised also. These data make it possible to acquire the utilization of the industrial truck for each transportation good individually, and thus to log and also clear the utilization of the industrial truck specifically for the transportation good.

Movement data of the industrial truck in the storeroom region can be also determined via RFID transponders. For this purpose, corresponding transponders with the necessary localisation information are provided at the pick-up place of the load, at the ware entrance for instance, as well as at the deposition location, the shelf location for instance, and are read out by the industrial truck.

Thus, from the combination of the travelled distances with the higher-ranking data obtained from the load good, utilization-dependent transportation fees can be determined, which are generated and memorised directly in a corresponding data processing module in the industrial truck. Transmission to higher-ranking processing systems for the company may then take place via wireless communication, like a WLAN for instance.

The utilization-dependent transportation fees can be acquired only in a very insufficient manner in a conventional way, by using a plant supervision data device for instance, because as a matter of fact, there are operation data of the industrial truck, but accurate information regarding type and properties of the load good are lacking.

In a preferred application of the present invention, an external logistics provider performs in-plant transportations by assignment of its customer, for instance. These services are cleared directly by means of the data obtained in the transportation process. For instance, this might be: pick-up location, destination location, weight and volume of the load good, assigned cost centre. The utilization dependent cost incurring for each transportation process of a transportation good is booked to corresponding accounts, which can be cleared at very real time or in regular intervals in a simple manner.

In a further possible application of the present invention, the calculated utilization dependent transportation fees are written directly on the RFID transponder situated on the load good by the industrial truck, after completion of a transportation job. A kind of transportation curriculum vitae develops there, with the cost incurred in the respective individual processes. For instance, the latter are determined at the handover of the ware in the responsibility of another company and are cleared in a corresponding way.

Figure 2:
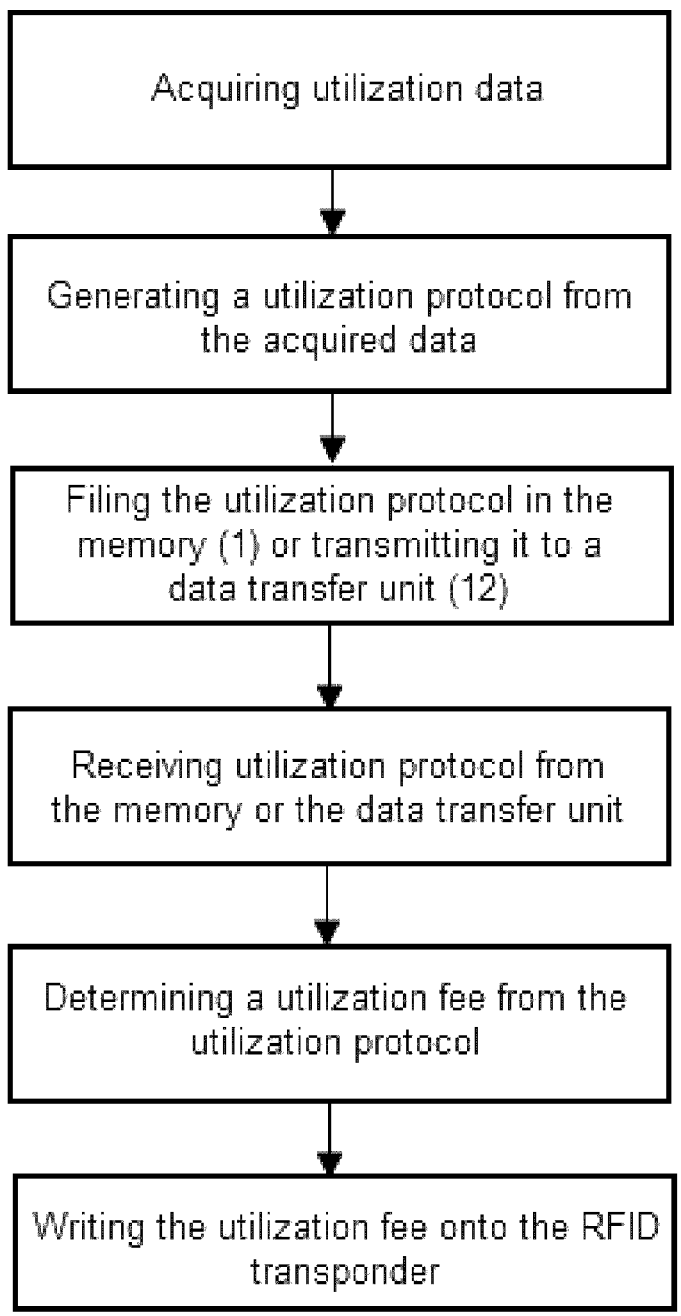
FIG. 2 shows a block diagram of the present invention shown in FIG. 1.

FIG. 2 is a block diagram of the present invention shown in FIG. 1. First, utilization data is acquired using equipment such as speed sensor 4, acceleration sensor 5, and load sensor 6. This data is transferred to the control unit 3, which continuously generates a utilization protocol from the acquired utilization data. The control unit 3 stores it in the memory 1 or transmits it to the data transfer unit 12. Data analysing unit 12 receives the utilization protocol from memory 1 or data transfer unit 12 and predetermines a utilization fee. Thus, a payment system for the utilization of the industrial truck can be provided, which individually determines the real operational demands and utilization intensity on the basis of the acquired utilization data.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. An industrial truck for transporting a load good, the industrial truck comprising:
    an electronic memory (1) and/or a data transfer unit (12);
    an equipment for acquiring utilization data;
    a data analyzing unit (10); and
    a control unit (3) connected with the equipment for acquiring utilization data and the memory (1) and/or the data transfer unit (12);
    characterised in that the load good has an RFID transponder; the control unit (3) continuously generates a utilization protocol from the acquired utilization data and files it in the memory (1) or transmits it to the data transfer unit (12); the data analyzing unit (10) reads out the utilization protocol from the electronic memory (1) or receives the utilization protocol from the data transfer unit (12); the data analyzing unit (10) determines a utilization fee based on the utilization protocol; and the utilization fee is written onto the RFID transponder of the load good.

2. An industrial truck according to claim 1, characterised in that the equipment for acquiring utilization data comprises a speed sensor (4) for measuring the speed of the industrial truck.

3. An industrial truck according to claim 1, characterised in that the equipment for acquiring utilization data comprises an acceleration sensor (5) for measuring the acceleration of the industrial truck.

4. An industrial truck according to claim 1, characterised in that the utilization data includes the distance travelled by the industrial truck.

5. An industrial truck according to claim 1, characterised in that the equipment for acquiring utilization data comprises a load sensor for determining the weight of a load.

6. An industrial truck according to claim 1, characterised in that the equipment for acquiring utilization data comprises a device for measuring the lifting height of a load.

7. An industrial truck according to claim 1, characterised in that the equipment for acquiring utilization data comprises a device for measuring at least one parameter of the hydraulic system of the industrial truck.

8. An industrial truck according to claim 1, characterised in that equipment for acquiring utilization data comprises a sensor in the driver's seat for recognizing the presence of a driver.

9. An industrial truck according to claim 1, characterised in that the equipment for acquiring utilization data is connected to the vehicle control for acquiring control data.

10. An industrial truck according to claim 1, characterised in that the equipment for acquiring utilization data comprises a sending and receiving unit (8) for reading out RFID-transponders.

11. An industrial truck according to claim 10, characterised in that the RFID-transponders work in the UHF band.

12. An industrial truck according to claim 1, characterised in that the utilization protocol contains a consolidated version of the utilization data.

13. An industrial truck according to claim 1, characterised in that the electronic memory has a hard disc, a memory chip or a chip card (2).

14. An industrial truck according to claim 13, characterised in that the electronic memory is integrated into a wireless network.

15. An industrial truck according to claim 1, characterised in that the data analyzing unit (10) announces when maintenance operations are due.

16. An industrial truck according to claim 1, characterised in that the equipment for acquiring utilization data acquires data from a picked-up load good and/or load support.

17. An industrial truck according to claim 16, characterised in that the equipment for acquiring utilization data acquires at least one of the following information: owner, consignee, proprietor and manufacturer of the ware.

18. An industrial truck according to claim 16, characterised in that the equipment for acquiring utilization data acquires the movement data of a load good and/or a load support.

19. An industrial truck according to claim 1, characterized in that at least the electronic memory (1) and/or the data transfer unit, the equipment for acquiring utilization data, and the control unit (3) are mounted onto the industrial truck.

* * * * *